2,820,784
Patented Jan. 21, 1958

2,820,784

COBALTIFEROUS AZO-DYESTUFFS

Christian Zickendraht, Binningen, and Arthur Buehler, Rheinfelden, Switzerland, assignors to Ciba Limited, Basel, Switzerland, a Swiss firm No Drawing. Application December 21, 1953
Serial No. 399,588

Claims priority, application Switzerland October 30, 1951

7 Claims. (Cl. 260—151)

This invention relates to the manufacture of new cobaltiferous azo-dyestuffs.

The invention is based on the observation that new, valuable cobaltiferous azo-dyestuffs are obtained when agents providing cobalt are reacted upon monoazo-dyestuffs which contain no sulfonic acid and carboxyl group and correspond to the general formula (1) 

in which R indicates a benzene radical attached to the azo group in ortho-position to the hydroxyl group, and A indicates a naphthalene radical which is attached to the azo group in adjacent position to the amino group, the dyestuff molecule containing a nuclear methyl sulfone group.

The monoazo-dyestuffs corresponding to the above formula, which serve as starting materials for the present process, can be obtained from ortho-hydroxy-diazo compounds of the benzene series and aminonaphthalenes which couple in adjacent position to the amino group, both of these starting materials being free from sulfonic acid and carboxyl groups and one of these starting materials containing a methyl sulfone group, which group may be present in the azo- or the diazo-component.

Such dyestuff components as contain a methyl sulfone group can be obtained for example from the corresponding sulfinic acids or sulfinic acid salts or from corresponding sulfonic acid halides. For example, an alkali salt of a sulfinic acid can be reacted with a methyl halide to form the corresponding methyl sulfone.

As examples of ortho-hydroxy-diazo compounds of the benzene series which are applicable for the preparation of the monoazo-dyestuffs serving as starting materials in the present process, those may be mentioned which are obtainable from the following amines:

(a) (Diazo-components containing methyl sulfone groups): 4-chloro-2-amino-1-hydroxybenzene-5- or -6-methylsulfone, 6 - chloro - 2 - amino-1-hydroxybenzene-4 - methylsulfone, 2 - amino - 1 - hydroxybenzene-4- or 5-methylsulfone, 4-nitro - 2 - amino-1-hydroxybenzene-6-methylsulfone and 5- or 6-nitro-2-amino-1-hydroxybenzene-4-methylsulfone (b) (Diazo-components free from methyl sulfone groups, which are to be coupled only with coupling components containing methyl sulfone groups): 4-chloro- or 4-methyl-2-amino-1-hydroxybenzene, above all ortho-hydroxy-aminobenzenes containing a nitro group, such as 4-, 5- or 6-nitro-2-amino-1-hydroxybenzene, 6-nitro-4-acetylamino-2-amino-1-hydroxybenzene, 4-chloro-5- or -6-nitro-2-amino-1-hydroxybenzene, 6 - chloro - 4 - nitro-2-amino-1-hydroxybenzene, 4-methyl-5- or -6-nitro-2-amino-1-hydroxybenzene, and 4,6 - dinitro - 2 - amino-1-hydroxybenzene.

As azo-components there are concerned amino-naphthalene compounds which couple in adjacent position to the $NH_2$-group and which are free from sulfonic acid and carboxyl groups; depending on the selection of the diazo-component, compounds of this type can be used which contain methyl sulfone groups such as 1-aminonaphthalene-4- or 5-methyl-sulfone, 2-aminonaphthalene-3-, -4-, -5-, -7- or preferably -6-methylsulfone, or aminonaphthalenes which are free from methyl sulfone groups, such as 6-bromo- or 6-methoxy-2-aminonaphthalene, 6-methyl-2-aminonaphthalene and primarily 2-aminonaphthalene. Instead of this latter component 2-aminonaphthalene-1-sulfonic acid can also be used, since this acid couples in 1-position with splitting off of the sulfonic acid group and therefore leads to the same starting dyestuffs as 2-aminonaphthalene itself. (See U. S. patent appln. Serial No. 307566 of September 2, 1952, by Alfred Hagenboecker and Max Blumer, now Patent No. 2,776,961.)

The coupling of the diazo compounds, which are obtained for example by means of sodium nitrite and hydrochloric acid in the customary manner from the amines set forth above under (a) and (b), with the azo components which are concerned, can likewise be carried out in the customary manner, for example in a neutral or acid medium.

When the coupling reaction is complete, the dyestuffs can easily be separated from the coupling mixture by filtration, since they are in general of low solubility in water.

The treatment of the monoazo-dyestuffs, obtained according to the above description, with agents providing cobalt, takes place according to the present process suitably in a weakly acid, neutral or especially in an alkaline medium. It is to be recommended in general to use for one molecule as a dyestuff less than one atom of cobalt, As agents providing cobalt, complex cobalt compounds of aliphatic hydroxycarboxylic acids or dicarboxylic acids can be used, or also simple cobalt salts such as cobalt acetate or cobalt sulfate, or if desired also cobalt hydroxide.

The conversion of the dyestuffs into the complex cobalt compounds takes place with advantage in the hot, with or without excess pressure, if desired in the presence of suitable additions, for example in the presence of salts of organic acids, of bases, organic solvents or other agents promoting complex-formation.

A single dyestuff of the Formula 1 given above may be subjected alone to the metallization process set forth above. It is however also possible and in many cases advantageous (for example in order to obtain different color shades) to metallize in a corresponding manner a dyestuff of the Formula 1 in admixture with an ortho: ortho'-dihydroxy-monoazo dyestuff free from sulfonic and carboxylic acid groups. Such ortho:ortho'-dihydroxy-monoazo dyestuffs can be prepared, for example, by coupling an ortho-hydroxydiazo compound of the benzene series with a compound capable of coupling in a position vicinal to a hydroxyl group or an enolizable keto group, provided that both starting materials are free from sulfonic acid groups and carboxyl groups. Especially valuable are the dyestuffs containing at least one sulfonic acid amide group.

The ortho-hydroxydiazo compounds suitable for the preparation of these dyestuffs are, for example, those mentioned above. Good results are also obtained with diazo compounds of amines containing sulfonic acid amide groups as for example the diazo compounds of 2-amino-1-hydroxybenzene-4-sulfonic acid amide, of 6-nitro- or 6-chloro-2-amino-1-hydroxybenzene-4-sulfonic acid amide, of 2-amino-1-hydroxybenzene-4- or -5-sulfonic acid methyl amide or of 4-nitro- or 4-chloro-2-amino-1-hydroxybenzene-5- or -6-sulfonic acid amide.

Examples of suitable coupling components of the kind mentioned are: Compounds with a phenolic hydroxyl group, such as para-substituted hydroxybenzenes and especially hydroxynaphthalenes, as for example, 5,8-dichloro-1-hydroxynaphthalene, 2-hydroxynaphthalene, 1-acetylamino-7-hydroxynaphthalene, 1-n-butyrylamino-7-hydroxynaphthalene; compounds containing a carbon atom capable of coupling in a heterocyclic ring, especially pyrazolones, hydroxyquinolines or barbituric acids, such as, for example, the 1-phenyl-3-methyl-5-pyrazolone, 1-(2'-, 3'- or 4'-chlorophenyl)-3-methyl-5-pyrazolone, the 1 - phenyl - 3-methyl-5-pyrazolone-3'-sulfonic acid amide, the 1-phenyl-3-methyl-5-pyrazolone-3'-N-methylsulfonic acid amide, the 2,4-dihydroxyquinoline, the 5-chloro-8-hydroxyquinoline, and barbituric acid itself; and advantageously compounds containing a carbon atom capable of coupling in an open chain, especially β-keto-carboxylic acid derivatives, preferably arylides thereof, e. g. acetoacetic acid arylides, such as acetoacetic acid anilide, 1-acetoacetylamino-2-, -3- or -4-chlorobenze.

The mixture to be metallized of the aforementioned ortho ortho'-dihydroxymonoazo dyestuffs with the dyestuffs of Formula 1 can be obtained by mixing the the individual dyestuffs in any quantity proportion. It is however advantageous in many cases to use equivalent quantities of the two starting dyestuffs.

The new products obtainable according to the present process are complex cobalt compounds of monoazo-dyestuffs which are free from sulfonic acid and carboxyl groups and contain one atom of cobalt in complex combination with substantially two monazo-dyestuff molecules of which one corresponds to the general formula (1) 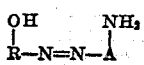

in which R indicates a benzene radical attached to the azo group in ortho-position to the hydroxyl group, and A indicates a naphthalene radical which is attached to the azo group in adjacent position to the amino group, the dyestuff molecule containing a nuclear methyl sulfone group, and the second dyestuff is a member of the group consisting of a monoazodyestuff as mentioned above and an ortho: ortho'-dihydroxy monoazodyestuff free from sulfonic acid and carboxylic acid groups.

The new dyestuffs containing cobalt are soluble in water and indeed are more soluble than the initial dyestuffs used for their manufacture. They are suitable for the dyeing and printing of a variety of materials, primarily however for the dyeing of animal material such as silk, leather and especially wool, but also for the dyeing and printing of synthetic fibers from superpolyamides and superpolyurethanes. They are primarily suitable for dyeing from weakly alkaline, neutral or weakly acid baths, in the latter case, for example, an acetic acid bath, and the dyebaths can obviously contain the customary dye auxiliary agents, for example distributing agents such as non-ionogenic reaction products of ethylene oxide upon fatty alcohols, also sodium sulfate, sodium pyrophosphate, polyphosphates and the like. The wool dyeings thus obtainable are distinguished by good levelling capacity, good fastness to light and very good fastness to washing, fulling, carbonizing and decatizing and also by the particular purity of their shades, which are preserved in artificial light.

The present application is a continuation in part of our copending application Serial No. 317, 138, filed October 27, 1952 (now abandoned).

The following examples illustrate the invention, the parts being by weight unless otherwise stated, the percentages being by weight and the relation between parts by weight and parts by volume being the same as that between the kilogram and the liter.

*Example 1*

18.7 parts of 2-amino-1-hydroxybenzene-4-methylsulfone are dissolved in 100 parts of water and 23.4 parts of hydrochloric acid of 30 percent strength and diazotized at 0 to 5° C. in an aqueous solution of 6.9 parts of sodium nitrite. A hot solution of 15.7 parts of β-naphthylamine in 250 parts of water and 18.5 parts of hydrochloric acid of 30 percent strength is run into the diazo suspension. Coupling is carried out at 35–40° C. The reaction is complete after 12 hours. The whole is heated to 90–95° C. and the dyestuff which has formed is filtered off. The filter cake is washed with hot water.

The resultant dyestuff paste is stirred in 500 parts of water at 80–85° C. and dissolved by adding 40 parts of a sodium hydroxide solution of 30 percent strength. A solution of 15.4 parts of crystallized cobalt sulfate in 30 parts of water is added and the whole stirred for 30 minutes at 80–85° C. At the end of this time the complex formation is finished. The dyestuff is precipitated by the addition of sodium chloride, filtered and dried. It is a water-soluble black powder which dissolves in concentrated sulfuric acid with a violet coloration and in sodium carbonate solution with a red orange coloration and dyes wool from a neutral to weakly acid bath gray tints of good fastness properties.

Similar complex cobalt compounds producing somewhat bluish-grayer or bluish-greener dyeings are obtained by converting in the above indicated manner the dyestuff prepared from β-naphthylamine and diazotized 4-chloro-2-amino-1-hydroxybenzene-5-methylsulfone or from β-naphthylamine and diazotized 2-amino-1-hydroxybenzene-5-methyl-sulfone into their cobalt compounds.

*Example 2*

The monoazo dyestuff obtained in the usual manner by diazotizing 22.1 parts of 5-nitro-2-amino-1-hydroxybenzene and coupling in an acid medium with 20.3 parts of 2-aminonaphthalene-6-methylsulfone is stirred in 500 parts of water at 80–85° C. and dissolved by the addition of 40 parts of a sodium hydroxide solution of 30 percent strength. A solution of 15.4 parts of crystalline cobalt sulfate in 30 parts of water is added and the whole is stirred for 30 minutes at 80–85° C. After this time the complex formation is complete. The dyestuff is precipitated by the addition of sodium chloride, filtered and dried. It is a water-soluble black powder which dyes wool from a neutral to weakly acid bath green-blue tints.

Column III of the table below indicates the shades obtained when wool is dyed with the cobalt complexes of the monoazo dyestuff obtainable according to this process from the dyestuff components mentioned in columns I and II.

| | I | II | III |
|---|---|---|---|
| 1 | OH, $O_2N$-, $NH_2$, $NO_2$ (benzene) | $NH_2$, naphthalene | Olive. |
| 2 | OH, $O_2N$-, $NH_2$, $NO_2$ (benzene) | $NH_2$, $SO_2CH_3$, naphthalene | Yellowish olive. |
| 3 | OH, $O_2N$-, $NH_2$ (benzene) | $NH_2$, $SO_2CH_3$, naphthalene | Dark green. |
| 4 | OH, $NO_2$-, $NH_2$, Cl (benzene) | $NH_2$, $SO_2$—$CH_3$, naphthalene | Gray. |
| 5 | OH, $NO_2$-, $NH_2$, Cl (benzene) | $NH_2$, $SO_2$—$CH_3$, naphthalene | Blue gray. |
| 6 | OH, $O_2N$-, $NH_2$, $CH_3$ (benzene) | $NH_2$, $SO_2$—$CH_3$, naphthalene | Gray. |
| 7 | OH, $O_2S$—$CH_3$, $NH_2$ (benzene) | $NH_2$, naphthalene | Do. |
| 8 | OH, $O_2S$—$CH_3$, $NH_2$, Cl (benzene) | $NH_2$, naphthalene | Do. |

Example 3

27.4 parts of 6-nitro-2-acetylaminophenol-4-methylsulfone, obtained by nitrating 2-acetylaminophenol-4-methylsulfone, are refluxed with 67 parts of hydrochloric acid of 30 percent strength and 50 parts of water until hydrolysis is complete. The yellowish solution so obtained is cooled by the addition of ice and diazotized with 25 parts by volume of a 4 N-sodium nitrite solution. A hot solution of 15.7 parts of 2-amino-naphthalene in 200 parts of water and 18.5 parts of hydrochloric acid of 30 percent strength is run into the diazo suspension. The whole is stirred at 35–40° C. until coupling is complete, then heated to 80° C. The completely precipitated dyestuff is separated by filtration and washed with hot water.

The resulting dyestuff paste is stirred in 1000 parts of water at 80–85° C. and dissolved by the addition of 27 parts of a sodium hydroxide solution of 30 percent strength. 100 parts of a cobalt sulfate solution having a cobalt content of 3.25 percent are added. After stirring for about half an hour at 80–85° C., metallization is complete. The cobalt complex is precipitated by the addition of sodium chloride. After drying it is a black powder which dyes wool from a weakly alkaline, neutral or weakly acid bath full bluish-green tints having good properties of fastness.

Example 4

19.3 parts of the dyestuff obtained from diazotized 5-nitro-2-amino-1-hydroxybenzene and 2-aminonaphthalene-6-methylsulfone, and 21.2 parts of the dyestuff obtained from diazotized 2-amino-1-hydroxybenzene-4-sulfonic acid methylamide and acetoacetic acid-ortho-chloranilide are dissolved together in 2000 parts of water with the addition of 8 parts of sodium hydroxide and then 100 parts of a cobalt sulfate solution having a cobalt content of 3.25 percent admixed at 80° C. After stirring for about half an hour at 80° C., metallization is complete. The cobalt complex is precipitated by the addition of sodium chloride. After drying it is a black powder which dissolves in water with a green coloration and in concentrated sulfuric acid with a red-brown coloration and dyes wool from a weakly alkaline, neutral or weakly acid bath full green shades having good properties of fastness.

In the table below other mixed complexes obtainable by this method are mentioned. Columns I and II indicate the starting monoazo dyestuffs and column III shows the shade obtained on wool with the corresponding cobalt mixed complex.

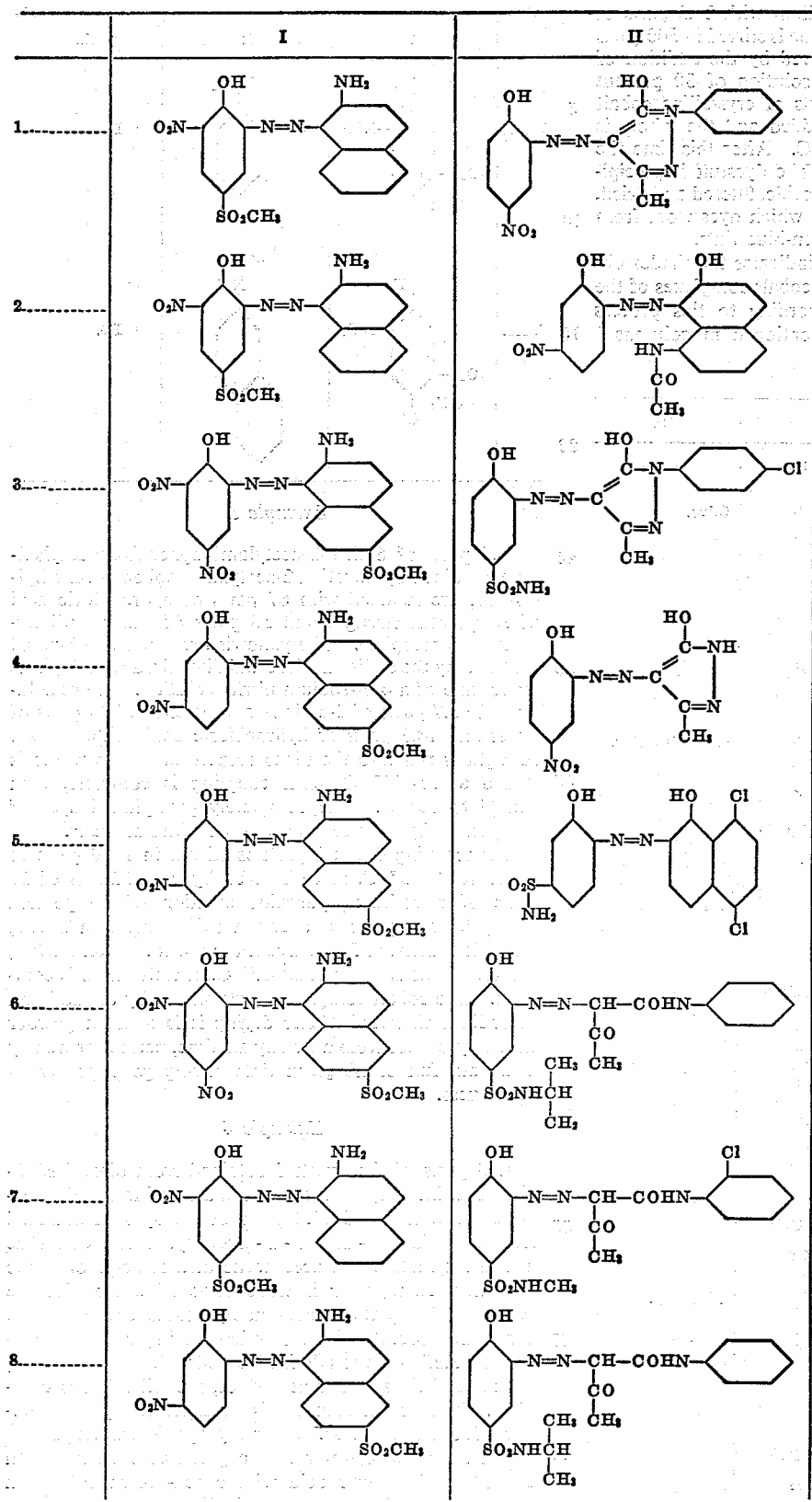

Example 5

0.5 part of the cobaltiferous dyestuff obtained according to Example 1 is dissolved in 4000 parts of water, 10 parts of crystallized sodium sulfate are added and into the resultant dyebath 100 parts of well wetted wool are entered at 40–50° C. 2 parts of acetic acid of 40 percent strength are then added and the temperature is raised to the boiling point in the course of half an hour. Dyeing is carried on for 45 minutes. Finally, the wool is rinsed with cold water and dried. There is thus obtained a level gray dyeing of good fastness to washing and fulling.

Practically the same dyeing is obtained when no acetic acid is added to the dyebath.

What is claimed is:

1. A complex cobalt compound which comprises a cobalt atom bound in complex union with substantially two monoazo dyestuff molecules free from sulfonic and carboxylic acid groups and corresponding to the formula

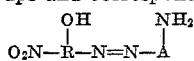

wherein R represents a benzene radical bound to the azo linkage in ortho-position to the hydroxyl group and A represents a naphthalene radical bound to the azo linkage in a position vicinal to the NH$_2$-group, the dyestuff molecule containing a nuclear methyl sulfone group.

2. A complex cobalt compound which comprises a cobalt atom bound in complex union with two monoazo dyestuff molecules free from sulfonic acid and carboxylic acid groups and corresponding to the formula

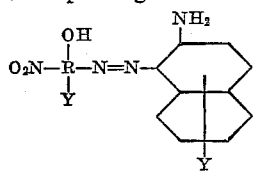

wherein R represents a benzene radical bound to the azo linkage in ortho-position relatively to the OH-group one of the Y's represents a methyl sulfone group and the other Y a hydrogen atom.

3. A complex cobalt compound which comprises a cobalt atom bound in complex union with two monoazo dyestuff molecules free from sulfonic acid and carboxylic acid groups and corresponding to the formula

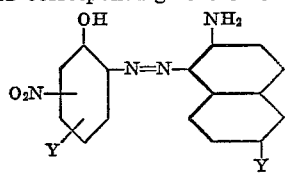

wherein one of the Y's represents a methyl sulfone group and the other Y a hydrogen atom.

4. The complex cobalt compound comprising one atom of cobalt bound in complex union with two molecules of the monoazo dyestuff of the formula

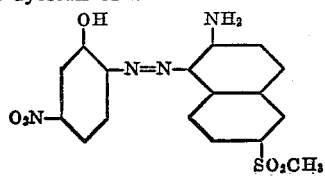

5. The complex cobalt compound comprising one atom of cobalt bound in complex union with two molecules of the monoazo dyestuff of the formula

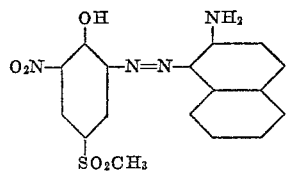

6. The complex cobalt compound comprising one atom of cobalt bound in complex union with two molecules of the monoazo dyestuff of the formula

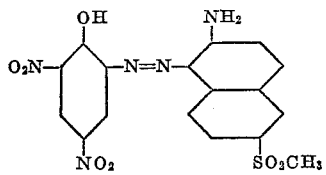

7. The complex cobalt compound comprising one atom of cobalt bound in complex union with two molecules of the monoazo dyestuff of the formula

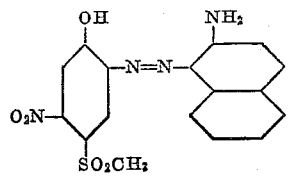

References Cited in the file of this patent

UNITED STATES PATENTS

| | | |
|---|---|---|
| 1,835,821 | Straub et al. | Dec. 8, 1931 |
| 1,908,571 | Straub et al. | May 9, 1933 |
| 2,551,056 | Schetty | May 1, 1951 |
| 2,565,898 | Widmer et al. | Aug. 28, 1951 |
| 2,674,515 | Widmer et al. | Apr. 6, 1954 |
| 2,776,956 | Zickendraht et al. | Jan. 8, 1957 |